(12) United States Patent
Nielsen et al.

(10) Patent No.: US 9,926,908 B2
(45) Date of Patent: Mar. 27, 2018

(54) HYDRAULIC PITCH SYSTEM FOR A WIND TURBINE

(71) Applicant: Vestas Wind Systems A/S, Aarhus N. (DK)

(72) Inventors: Jakob Hviid Nielsen, Tjele (DK); Soren Kjaer Nielsen, Aalborg (DK); Ole Mølgaard Jeppesen, Skjern (DK); Jesper Lykkegaard Neubauer, Hornslet (DK)

(73) Assignee: Vestas Wind Systems A/S, Aarhus N. (DK)

( * ) Notice: Subject to any disclaimer, the term of this patent is extended or adjusted under 35 U.S.C. 154(b) by 679 days.

(21) Appl. No.: 14/361,968

(22) PCT Filed: Nov. 28, 2012

(86) PCT No.: PCT/DK2012/050435
§ 371 (c)(1),
(2) Date: May 30, 2014

(87) PCT Pub. No.: WO2013/079071
PCT Pub. Date: Jun. 6, 2013

(65) Prior Publication Data
US 2014/0328679 A1 Nov. 6, 2014

Related U.S. Application Data

(60) Provisional application No. 61/564,876, filed on Nov. 30, 2011.

(30) Foreign Application Priority Data

Nov. 30, 2011 (DK) .................................. 2011 70661

(51) Int. Cl.
F03D 7/02 (2006.01)
F03D 7/04 (2006.01)
F03D 80/50 (2016.01)

(52) U.S. Cl.
CPC ........... *F03D 7/0264* (2013.01); *F03D 7/024* (2013.01); *F03D 7/0224* (2013.01);
(Continued)

(58) Field of Classification Search
CPC .... F03D 7/0264; F03D 7/0268; F03D 7/0244; F03D 7/0248; F03D 7/0224; F03D 7/024; F03D 1/003
See application file for complete search history.

(56) References Cited

U.S. PATENT DOCUMENTS 2,645,379 A * 7/1953 Audia ...................... B67D 1/07
137/237
4,352,634 A 10/1982 Andrews
(Continued)

FOREIGN PATENT DOCUMENTS

DE 102006012009 A1 9/2007
EP 0266715 A2 11/1988
(Continued)

OTHER PUBLICATIONS

International Searching Authority, International Search Report and Written Opinion issued in corresponding PCT Application No. PCT/DK2012/050435 dated Feb. 6, 2013, 10 pages.
(Continued)

*Primary Examiner* — Atif Chaudry
(74) *Attorney, Agent, or Firm* — Wood Herron & Evans LLP

(57) ABSTRACT

The present invention relates to a hydraulic pitch system for pitching a blade of a wind turbine having a hub by means of a hydraulic fluid. The system comprises at least one hydrau-
(Continued)

lic cylinder for adjusting a pitch angle of the blade, the hydraulic cylinder comprising a pitch piston movable in the hydraulic cylinder, and a first port and a second port arranged on each side of the pitch piston, and an accumulator hydraulically connected to the cylinder. The system further comprises a pitch safety system adapted to maintain the blade in a predetermined pitch angle when a person is entering the hub of the wind turbine for service and/or maintenance, the pitch safety system comprising a first valve which by activation releases a pressure in the hydraulic pitch system by draining off the accumulator for the hydraulic fluid until the pressure has reached a predetermined pressure level.

20 Claims, 4 Drawing Sheets

(52) U.S. Cl.
CPC ......... *F03D 7/0244* (2013.01); *F03D 7/0248* (2013.01); *F03D 7/0268* (2013.01); *F03D 7/04* (2013.01); *F03D 80/50* (2016.05); *F05B 2270/604* (2013.01); *Y02E 10/723* (2013.01)

(56) References Cited

U.S. PATENT DOCUMENTS

| | | | | |
|---|---|---|---|---|
| 4,792,281 A | * | 12/1988 | Coleman | ............... F03D 7/0224 416/135 |
| 2008/0030027 A1 | * | 2/2008 | Erdman | ................ F03D 7/0224 290/40 R |
| 2009/0224543 A1 | * | 9/2009 | Steudel | ................ F03D 7/0224 290/44 |
| 2010/0014972 A1 | * | 1/2010 | Steffensen | ........... F03D 7/0224 416/31 |
| 2010/0061852 A1 | * | 3/2010 | Potter | ................... F03D 7/0224 416/31 |
| 2011/0044813 A1 | * | 2/2011 | Lindberg | .............. F03D 7/0224 416/1 |
| 2011/0198854 A1 | | 8/2011 | Minami et al. | |
| 2012/0134818 A1 | * | 5/2012 | Sato | ........................ F03D 80/60 416/95 |
| 2012/0187681 A1 | * | 7/2012 | Andersen | ............. F03D 7/0224 290/44 |

FOREIGN PATENT DOCUMENTS

| | | |
|---|---|---|
| EP | 2063112 A2 | 5/2009 |
| EP | 2392819 A1 | 12/2011 |
| FR | 2500078 A | 8/1982 |
| GB | 2071780 A | 9/1981 |
| WO | 2009064264 A1 | 5/2009 |

OTHER PUBLICATIONS

Danish Patent and Trademark Office, Combined search and examination report issued in corresponding DK application No. PA 2011 70661 dated Jul. 12, 2012, 9 pages.

* cited by examiner

_HYDRAULIC PITCH SYSTEM FOR A WIND TURBINE_

FIELD OF THE INVENTION

The present invention relates to a hydraulic pitch system for pitching a blade of a wind turbine having a hub by means of a hydraulic fluid, comprising:
- at least one hydraulic cylinder for adjusting a pitch angle of the blade, the hydraulic cylinder comprising a pitch piston movable in the hydraulic cylinder, and a first port and a second port arranged on each side of the pitch piston, and
- an accumulator hydraulically connected to the cylinder.

The present invention also relates to a wind turbine as well as to a method for activating a pitch safety system.

BACKGROUND ART

In a wind turbine, a hydraulic pitch system is used to control the pitch angle of the rotor blades in order to optimise the wind energy production and to ensure that the rotor blades are not subjected to too large loads when strong winds are blowing.

Since pitching actions require activity from the pitch cylinders, a potential hazard exists in situations where persons are located inside the hub, for instance during blade installation or pitch system maintenance.

If the blades are not fully extended and the normal control system is activated, personnel may potentially be injured or, in severe circumstances, crushed between the moving pitch cylinders and the stationary hub wall.

Thus, there is a need for providing a system which protects the service technician and others in the hub of the wind turbine from unintended and dangerous situations.

SUMMARY OF THE INVENTION

It is an object of the present invention to wholly or partly overcome the above disadvantages and drawbacks of the prior art. More specifically, it is an object to provide a hydraulic pitch system with a pitch safety system.

The above objects, together with numerous other objects, advantages, and features, which will become evident from the below description, are accomplished by a solution in accordance with the present invention by a hydraulic pitch system for pitching a blade of a wind turbine having a hub by means of a hydraulic fluid, comprising:
- at least one hydraulic cylinder for adjusting a pitch angle of the blade, the hydraulic cylinder comprising a pitch piston movable in the hydraulic cylinder, and a first port and a second port arranged on each side of the pitch piston, and
- an accumulator hydraulically connected to the cylinder,
further comprising a pitch safety system adapted to maintain the blade in a predetermined pitch angle when a person is entering the hub of the wind turbine for service and/or maintenance, the pitch safety system comprising a first valve which by activation releases a pressure in the hydraulic pitch system by draining off the accumulator for the hydraulic fluid until the pressure has reached a predetermined pressure level.

Hereby it is avoided that the accumulated energy in the accumulator is inadvertently released when an operator is present in the hub and near the pitch system. Thus, a safe and secure pitch safety system is obtained which eliminates the potential hazards of the accumulated energy in the accumulator. Accordingly, the pitch safety system is set to drain off the accumulator for the hydraulic fluid, so that, as described above, the accumulator is without the pressure, i.e. energy, to inadvertently pitch the blades when the operator is in the hub.

Furthermore, the first valve, such as a needle valve, a solenoid valve, pilot valve or a ball valve may be arranged for draining off the accumulator for hydraulic fluid, and/or closing off the inlet to the accumulator.

Additionally, a plurality of first valves may be arranged adapted for assisting in draining off the accumulator(s) for hydraulic fluid.

Moreover, the draining of the accumulator may be performed automatically by activating the first valve via an activation panel, the activation panel being positioned at a distance from the first valve. Hereby it is obtained that the operator does not need to be inside the hub before the pitch safety system is activated, whereby the risk of personal injury from unintended pitching of the blades is reduced.

Advantageously, the activation panel may be arranged outside the hub, for instance in the nacelle.

Also, the draining of the accumulator may be performed by an operator present in the hub manually activating the first valve.

Additionally, the pitch safety system may comprise a second valve, such as a ball valve or a shut-off valve, the second valve being adapted to be closed off manually.

Furthermore, the second valve may only be reachable from within the hub or may be arranged inside the hub reachable from outside the hub.

Moreover, the second valve may be closed off automatically.

Furthermore, the first and second ports of the pitch cylinder may be blocked by activation of the pitch safety system. Hereby it is secured that the piston in the pitch cylinder is locked so that the blade is also locked, causing the blade to be unable to pitch before one of the ports is not blocked anymore. Furthermore, it has the advantage that gravity and wind forces will not inadvertently have the blades pitching.

Additionally, the blocking of the first and second ports may be performed automatically by activation of the pitch safety system.

Moreover, the predetermined pitch angle may be in a circumstance where the blade is in its feathering position, approximately ±90 degrees. In this circumstance, the blades mean to minimise their angle of attack by turning the blades to be parallel to the airflow, which minimises the drag/lift of the blade. In the 90 degrees position of the blade, a leading edge of the blade is facing the airflow, and in the −90 degrees position of the blade, a trailing edge of the blade is facing the airflow.

Also, the predetermined pressure level may be a gas pre-charge pressure of the accumulator or below the gas pre-charge pressure. Hereby it is secured that the accumulator does not have accumulated energy.

Moreover, the predetermined pressure level may be 10% below the gas pre-charge pressure of the accumulator, preferably 50% below the gas pre-charge pressure of the accumulator, most preferably 70% below the gas pre-charge pressure of the accumulator.

Additionally, a pump unit may be arranged in connection with the pitch system, said pump unit being adapted to be activated by the operator present in the hub, so that the pitch angle of the blade can be changed if necessary during service and maintenance. Hereby, the operator has the possibility of partly activating the pitch system. Preferably, the system is in a fail-safe mode, meaning that if the operator does not perform an intended operation, it would not be possible to pitch the blades, since this is performed in the safe mode.

Furthermore, a service panel may be arranged at an entrance to the hub so that the operator can activate the pitch safety system before entrance into the hub. The activation panel and service panel may be incorporated in the same panel.

Moreover, a plurality of emergency stops for the pitch system may be arranged inside the hub and a spinner with a mutual distance between them so that they are reachable by the operator independently of where he/she is in the hub or spinner. This provides additional safety for the persons present in the hub, since they are able to stop all moving systems present in the hub via the emergency stops.

Additionally, the pitch safety system may comprise a mechanical locking device which is adapted to be inserted in connection with the blade, thereby mechanically locking the blade in a predetermined position. This provides additional safety for the persons working in the hub, especially during service and maintenance of the pitch system.

Furthermore, a wind turbine controller may be connected to the pitch system, the wind turbine controller being adapted to assisting in the control of the pitch system.

Also, at least one hydraulic cylinder and accumulator may be arranged in connection with a blade. In addition, one or more hydraulic cylinders may be arranged in connection with the specific blade, and/or one or more accumulators may also be connected with the specific blade.

In addition, the pitch safety system may comprise visual indications, for indicating whether it is safe for an operator to enter the hub or the spinner. Furthermore, the visual indications may be lights. The lights may have different colours, they may flash or the like for indicating specific situations for the operator before entering the hub.

Furthermore, the pitch system may comprise an interlock system, which is connected to the accumulator pressure and a locking device, which is arranged to block the entrance to the hub.

Moreover, the pitch safety system may comprise a control unit, the control unit being adapted for controlling that the hydraulic pitch system, and thereby the wind turbine, is in its service mode.

The present invention also relates to a wind turbine comprising the hydraulic pitch system as mentioned above.

Additionally, the present invention relates to a method for activating a pitch safety system in a hydraulic pitch system comprising any of the features mentioned above, comprising the steps of
    activating the pitch safety system so that the blades are being positioned in their feathering positions,
    draining off hydraulic fluid from an accumulator until a hydraulic pressure reaches a predetermined level,
    entering the hub.

Hereby it is avoided that the accumulated energy in the accumulator is inadvertently released when an operator is present in the hub and near the pitch system. Thus, a method for activating a pitch safety system is obtained which eliminates the potential hazards of the accumulated energy in the accumulator. Accordingly, by draining off the accumulator for the hydraulic fluid so that the accumulator is without the pressure, i.e. energy, the risk that the blades are inadvertently pitched when the operator is in the hub is reduced.

Furthermore, the draining off of hydraulic fluid is performed automatically by activation of the pitch safety system.

Moreover, a second valve may be closed off either automatically or manually.

Preferably, the wind turbine is stopped and a rotor lock is applied before the pitch safety system is activated.

The present invention also relates to a method for locking a blade of a wind turbine in a predetermined pitch angle, the method comprising the steps of
    applying the pitch safety system of the hydraulic pitch system comprising any of the features mentioned above for positioning the blade in the predetermined pitch angle,
    inserting a mechanical locking device in connection with the blade for mechanically locking and securing the blade in the predetermined pitch angle.

BRIEF DESCRIPTION OF THE DRAWINGS

The invention and its many advantages will be described in more detail below with reference to the accompanying schematic drawings, which for the purpose of illustration show some non-limiting embodiments and in which.

All the figures are highly schematic and not necessarily to scale, and they show only those parts which are necessary in order to elucidate the invention, other parts being omitted or merely suggested.

DETAILED DESCRIPTION OF THE INVENTION

Figure 1:
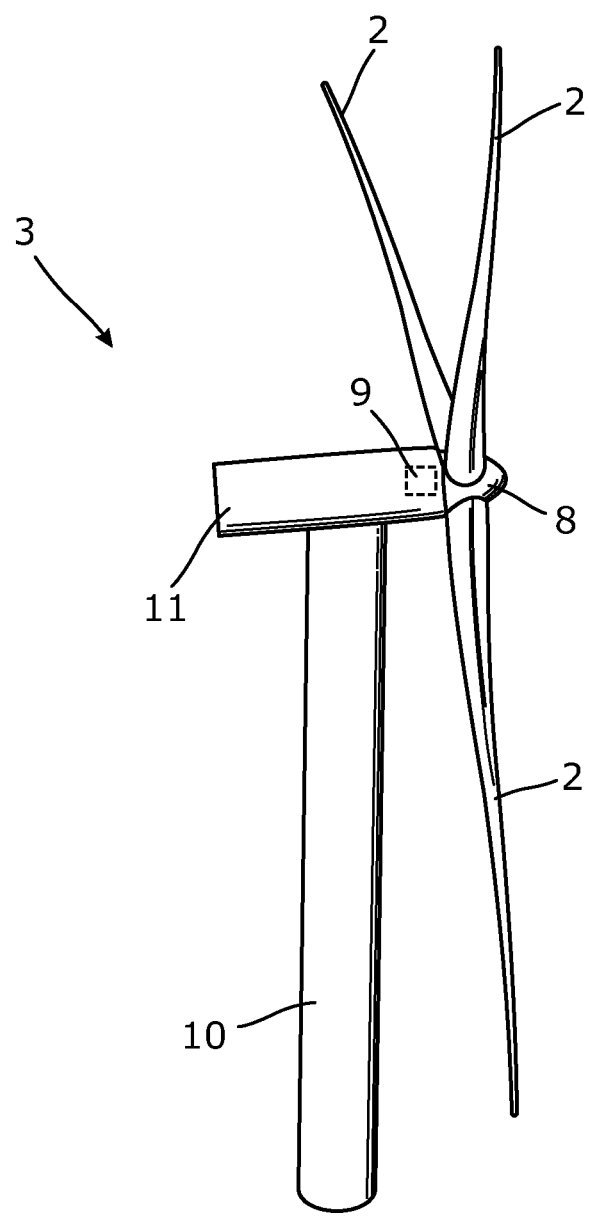
FIG. 1 shows a wind turbine comprising a hydraulic pitch system according to the present invention.

In FIG. 1, a wind turbine 3 having a tower 10, a nacelle 11, a hub/spinner 8 and rotor blades 2 are mounted to the hub. Furthermore, the wind turbine 3 comprises a hydraulic pitch system (not shown) for adjusting the pitch angle of the blades 2 in response to the actual wind speed and the wind direction to ensure that the blades are pitched for providing optimum lift and thereby higher efficiency of the wind turbine 3 and that no damage occurs in the wind turbine 3 due to a high wind load on the blades. The wind turbine 3 also has a control system 9 arranged in the nacelle 11 for controlling the operation of the wind turbine.

Figure 2:
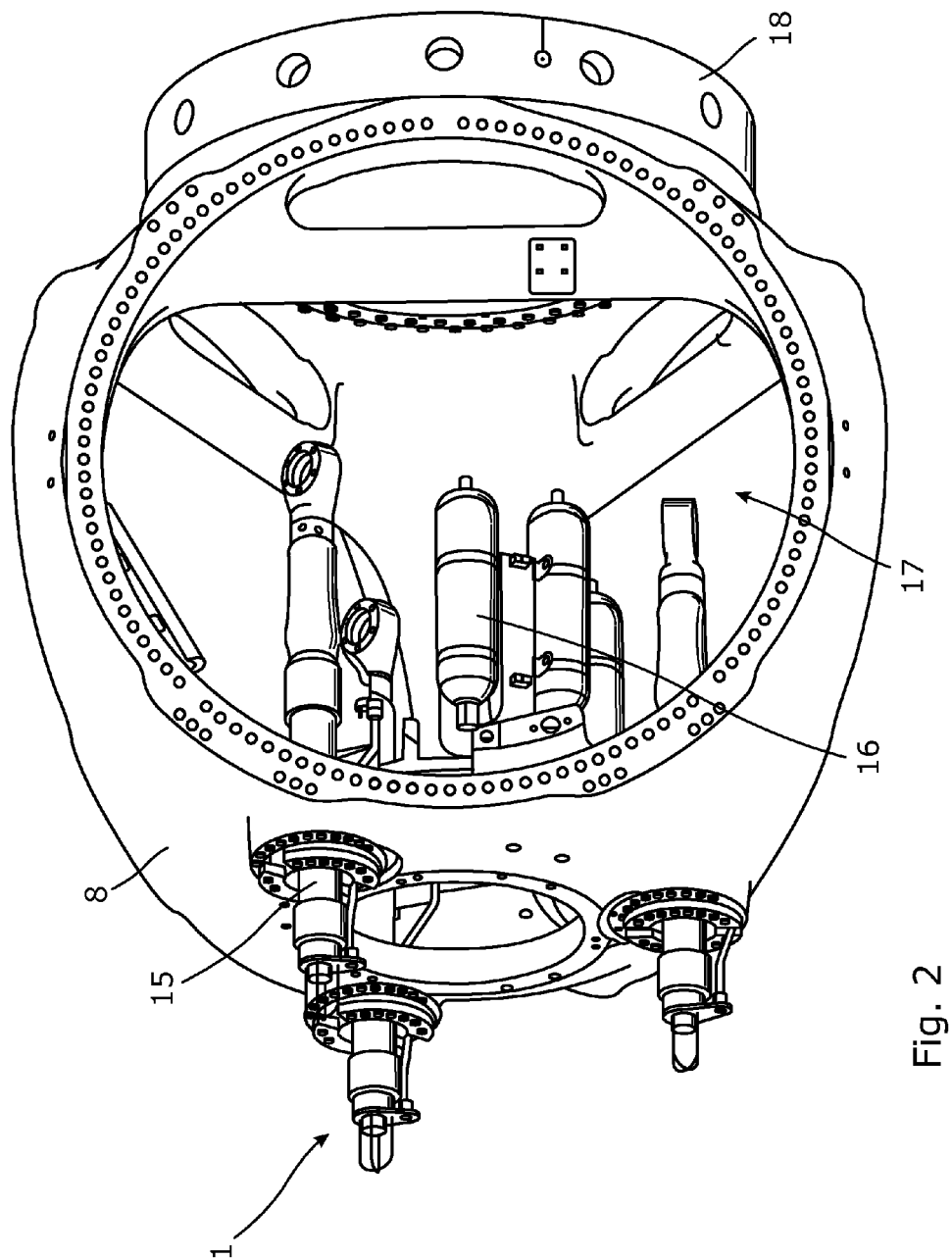
FIG. 2 shows a wind turbine hub in which the hydraulic pitch system has been installed.

In FIG. 2, the hydraulic pitch system 1 is shown mounted in the hub 8, but the rotor blades have not yet been mounted onto the hub 8. For each rotor blade the hydraulic pitch system 1 comprises a hydraulic cylinder 15 for adjusting a pitch angle of the blade, the hydraulic cylinder comprising a pitch piston (not shown) movable in the hydraulic cylinder 15, and a first inlet and a second inlet (not shown) arranged on each side of the pitch piston, and an accumulator 16 hydraulically connected to the cylinder 15. The cylinder 15 adjusts the pitch angle of the rotor blade in response to wind measurements conducted in another part of the wind turbine 3, and the accumulator 16 absorbs pulsations in the hydraulic system 1 and is used as energy backup.

The opening 17 shown in FIG. 2 is for the blade to be mounted to the hub 8. This hub 8 has three openings for mounting three blades to the hub. The hub 8 is at a first end 18 rotatably connected with the nacelle (not shown), at which end 18 entrance into the hub 8 from nacelle is provided. Entrance into the hub 8 may also be possible via a hatch (not shown) arranged in a spinner (not shown) surrounding the hub 8.

Figure 3:
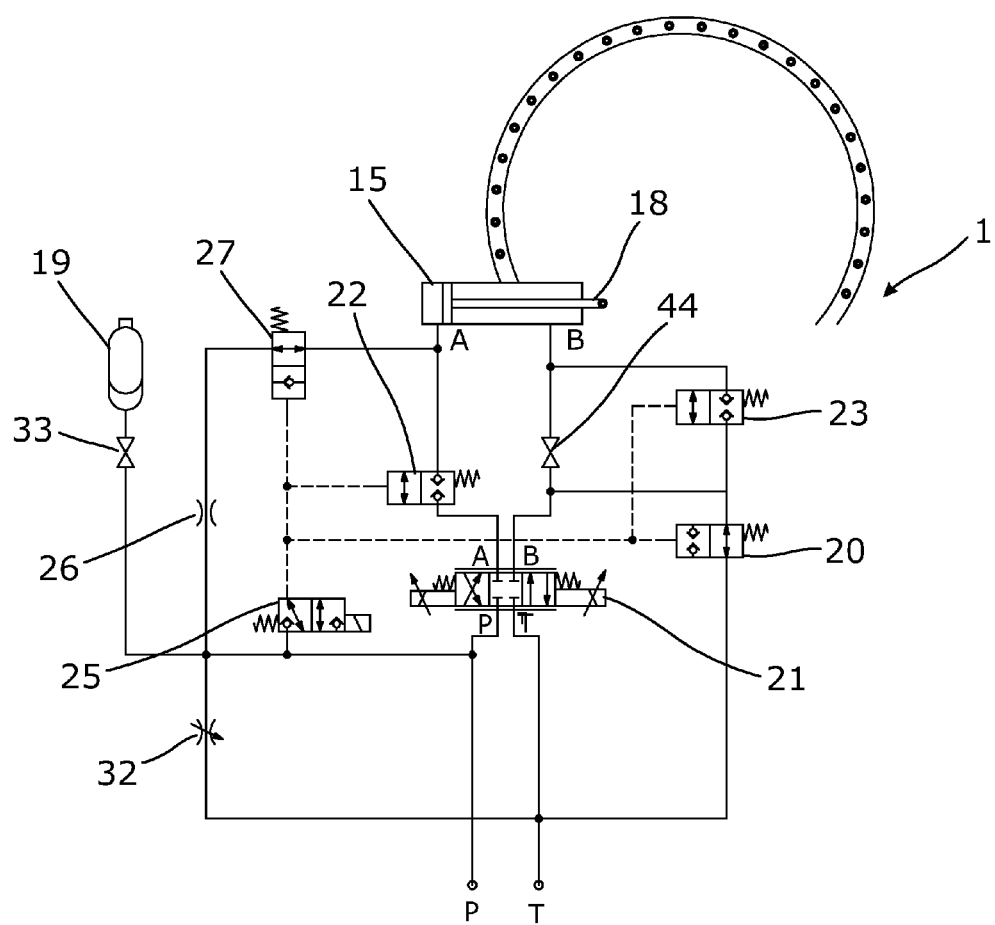
FIG. 3 shows a schematic diagram of a hydraulic pitch system.

In FIG. 3, a schematic diagram of an embodiment of the hydraulic pitch system 1 is shown. The wind turbine is equipped with a hydraulic pitch system 1 for each blade, all located in the hub 8.

Each hydraulic pitch system 1 comprises a hydraulic cylinder 15 fastened to the hub 8 and to the blade root (not shown) with the piston rod 18 via a torque arm shaft. Valves facilitating operation of the pitch cylinder 15 are installed. Each pitch block is connected to an accumulator 19. Extra accumulators (not shown) may be connected to the pressure line.

Each pitch system 1 is capable of pitching the corresponding blade to any position in the range from for instance −90° to 90°. During normal production operation, the pitch systems 1 work as individual systems, adjusting to an individual pitch reference angle. In a service mode it is possible to operate the pitch systems individually.

During normal operation of the wind turbine, the shut off valves 33 are in open position and the solenoid valves 25 on each pitch block are energised, thereby pressurising the system. The proportional valve 21 is pressurised.

When the proportional valve 21 is switched to 'cross connection' P-B and A-T, hydraulic fluid is sent through P-B to the second port B of the cylinder 15. The piston retracts. Hydraulic fluid from the first port A of the cylinder 15 is returned to the tank (not shown) through the pilot-operated valve 22 and the proportional valve 21 through port A to T.

When the proportional valve 21 is switched to 'straight connection' P-A, hydraulic fluid is sent through P-A through the pilot-operated valve 22 to the first port A of the cylinder 15. The piston 18 extends, equivalent to pitching the blade in the direction 90°. Hydraulic fluid from the second port B of the cylinder 15 is returned to the tank line through the connection consisting of the shut off valve 44 and the B-T port of the proportional valve 21.

The accumulator 19 on each pitch system 1 is pressurised during each pitch process.

During a stop and/or an emergency stop of the wind turbine, the shut off valves are in open position and the solenoid valves 25 on each pitch block and pilot pressure is de-energised, and hydraulic fluid is led from the pitch accumulator 19 through the shut off valve, the orifice 26 and the pilot-operated valves 27 to the first port A of the cylinder 15. The hydraulic fluid from the second port B is drained to the tank line through the pilot-operated valve 20. The blades are pitched to a mechanical end position of 90° or −90° with no influence from the proportional valve 21 at all.

The pilot-operated valve 27 only allows hydraulic fluid flow into the pitch cylinder 15. Pitch forces from the wind will not be capable of returning hydraulic fluid from the first port A end of the cylinder 15 into the accumulator 19 and thus pitch the blades against run position.

An emergency feathering velocity is controlled by the flow control valve, and emergency feathering is performed, irrespective of the wind speed.

When service and/or maintenance are to be performed in the hub 8, the accumulator 19 is drained via a first valve 32, in this embodiment needle valves 32, and the shut off valves must be set to closed position. Hereby it is avoided that the accumulated energy in the accumulator is inadvertently released when an operator is present in the hub and near the pitch system. Thus, a safe and secure pitch safety system is obtained which eliminates the potential hazards of the accumulated energy in the accumulator. Accordingly, the pitch safety system is set to drain off the accumulator for the hydraulic fluid so that, as described above, the accumulator is without the pressure, i.e. energy, to inadvertently pitch the blades when the operator is in the hub. Furthermore, the solenoid valves 25 on each pitch block (emergency pitch valves) are energised, thereby pressurising the pilot system. The proportional valve 21 is pressurised. The selected pitch cylinder 15 may be controlled via an activation panel (not shown).

Via the activation panel, the proportional valve 21 can be switched to 'cross connection' P-B and A-T. Like in normal operation of the wind turbine as described above, hydraulic fluid is led through P-B to the second port B of the cylinder 15. The piston 18 retracts, equivalent to pitching the blade in the direction −5°. Hydraulic fluid from the first port A of the cylinder 15 is returned to the tank through the pilot-operated valve 22 and the proportional valve 21 through port A to T.

Via the activation panel, the proportional valve 21 can be switched to 'straight connection' P-A, hydraulic fluid is sent through P-A through the pilot-operated valve 22 to the first port A of the cylinder 15. The piston extends, equivalent to pitching the blade in the direction 90°. Hydraulic fluid from the second port B of the cylinder 15 is returned to the pressure line through the pilot-operated valve 23 and the B-T port of the proportional valve 21.

Furthermore, the operator entering the hub closes off the ball valve 33 manually and thereby blocks the accumulator 19.

Furthermore, if the emergency stop button (not shown) is activated during service/work in the hub, the pilot pressure is released and the pitch cylinder 15 is kept in actual position. The A side of the cylinder 15 is blocked by the pilot-operated valves 27 and 22. The B side of the cylinder 15 is blocked by the shut off valve 44 and the pilot-operated on/off valve.

Figure 4:
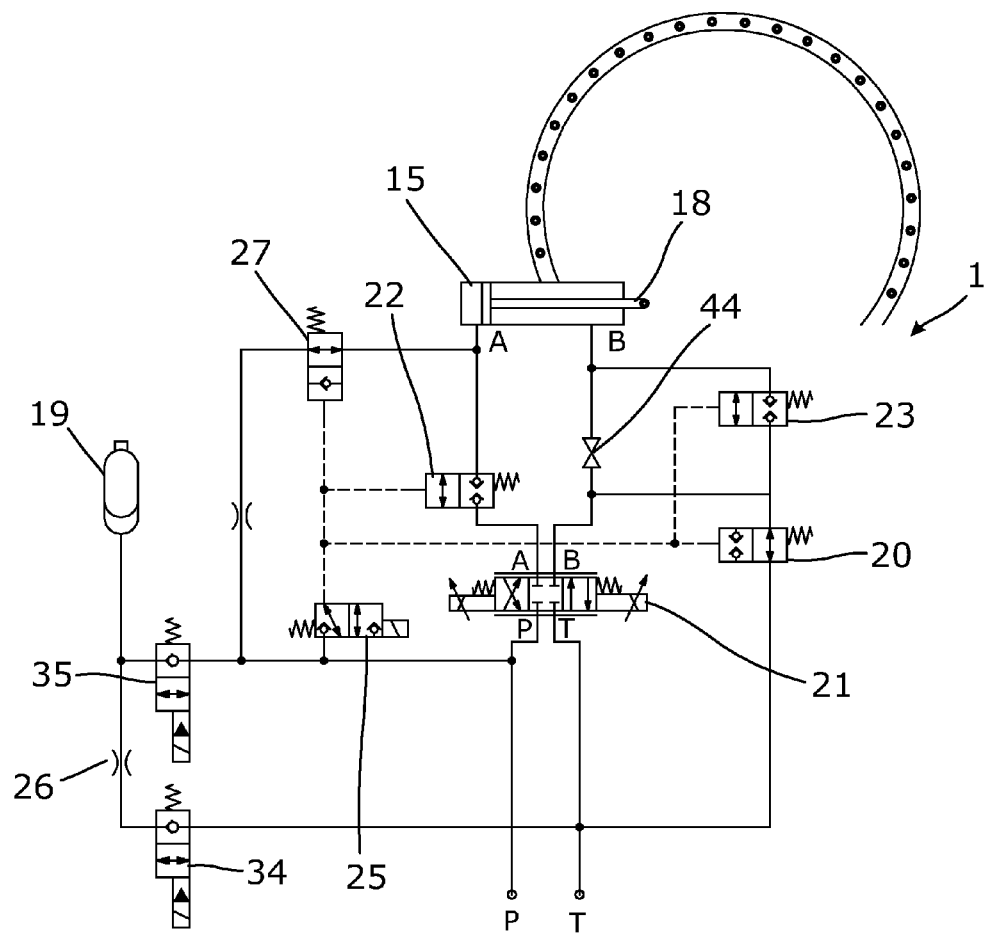
FIG. 4 shows another embodiment of a hydraulic pitch system.

In FIG. 4, a schematic diagram of another embodiment of the hydraulic pitch system 1 is shown. The operation of the hydraulic pitch system 1 is substantially identical to that of the hydraulic pitch system 1 of FIG. 3, so the overall functions as described in connection with FIG. 3 also apply to FIG. 4. However, there are some differences in relation to FIG. 3.

When service and/or maintenance are to be performed in the hub 8 having a pitch system 1 according to FIG. 4, the draining and blocking of the accumulator 19 is initiated by the first valve 34, in this embodiment a solenoid valve 34. The inlet pressure is blocked by solenoid valve 35.

Thus, in this embodiment, the electrical solenoid valve 34 is used to automatically drain the hydraulic pressure in the accumulator 19, which is performed manually in the hydraulic pitch system described in FIG. 3 above. Accordingly, the pressure is drained from outside the hub. The electrical solenoid valve 35 is used to block the inlet to the accumulator.

As described above, the ball valve 44 must be closed physically by an operator when entering the hub. This will result in the B-port of the cylinder and maybe the inlet of the accumulator 19 being blocked. In another not shown embodiment, the ball valve may be closed automatically.

Furthermore, when moving the blades during service, the pump unit (not shown) is running in a special service mode (a fail-safe mode), in which the pressure is controlled by a relief valve in the pump unit.

Thus, when a service or maintenance job requires an operator present in the hub, the wind turbine is first stopped and a manual rotor lock (not shown) is applied. Subsequently, the operator must be able to drain the pitch accumulators by pressing a service button on the service panel in the nacelle or by operating a service switch next to the entrance to the hub.

When the pressure in the accumulators is equal to or below the gas pre-charge pressure of the accumulator, and an indicator indicates that the hub is in a safe mode, the operator may enter the hub to manually close the three ball valves placed on the three pitch blocks. When the ball valves have been closed, the indicator indicates that the valves have been closed.

For security reasons the predetermined pressure level may be set to be considerably below the gas pre-charge pressure of the accumulator. It may for instance be set to be below 5 bars, even though the gas pre-charge pressure for the specific accumulator is 110 bar.

Accordingly, a procedure for activating the pitch safety system according to the invention may comprise the following steps:

Stop the wind turbine
Apply the rotor lock
Activate an activation panel, which activates a wind turbine controller,
The wind turbine controller automatically activates the hydraulic pitch systems for pitching the blades, and the blades will pitch to 90° (the blade pitch lock is automatically activated at ≥88°)
The wind turbine controller automatically activates the pitch safety systems for draining off hydraulic fluid from the pitch accumulators, and the hydraulic pressure drops (the hydraulic pressure drops to ≤5 bar)
Waiting approximately 2 minutes until the hydraulic pressure in the pitch accumulators is ≤5 bars
The indicator, for instance a green LED indicator lamp for safe mode, starts flashing if the hydraulic pressure in the pitch accumulators is ≤5 bars
Enter the hub when the green LED indicator lamp for safe mode starts flashing
Manually close the three ball valves placed on the three pitch blocks
The green LED indicator lamp placed on the hub cabinet turns to be on constantly
The hub safety system is now activated.

Although the invention has been described in the above in connection with preferred embodiments of the invention, it will be evident for a person skilled in the art that several modifications are conceivable without departing from the invention as defined by the following claims.

The invention claimed is:

1. A hydraulic pitch system for pitching a blade of a wind turbine having a hub by means of a hydraulic fluid, comprising:
   at least one hydraulic cylinder for adjusting a pitch angle of the blade, the hydraulic cylinder comprising a pitch piston movable in the hydraulic cylinder, and a first port and a second port arranged on respective sides of the pitch piston, and
   an accumulator located within the hub and hydraulically connected to the cylinder, further comprising a pitch safety system adapted to maintain the blade in a predetermined pitch angle when a person is entering the hub of the wind turbine for service and/or maintenance, the pitch safety system comprising a first valve which by activation releases a pressure in the hydraulic pitch system by draining off the accumulator for the hydraulic fluid until the pressure has reached a predetermined pressure level,
   wherein a service panel is arranged at an entrance to the hub so that the operator can activate the pitch safety system before entrance into the hub.

2. The hydraulic pitch system according to claim 1, wherein the draining of the accumulator is performed automatically by activating the first valve via an activation panel, the activation panel being positioned at a distance from the first valve.

3. The hydraulic pitch system according to claim 1, wherein the pitch safety system comprises a second valve, the second valve being adapted to be closed off manually.

4. The hydraulic pitch system according to claim 1, wherein the predetermined pitch angle is in a circumstance where the blade is in its feathering position, approximately ±90 degrees.

5. The hydraulic pitch system according to claim 1, wherein the predetermined pressure level is a gas pre-charge pressure of the accumulator.

6. The hydraulic pitch system according to claim 1, wherein a pump unit is arranged in connection with the pitch system, the pump unit being adapted to be activated by the operator present in the hub so that the pitch angle of the blade can be changed if necessary during service and maintenance.

7. The hydraulic pitch system according to claim 1, wherein a plurality of emergency stops for the pitch system are arranged inside the hub and a spinner with a mutual distance between them so that they are reachable by the operator independent of where he/she is in the hub or spinner.

8. The hydraulic pitch system according to claim 1, wherein at least one hydraulic cylinder and accumulator are arranged in connection with a blade.

9. The hydraulic pitch system according to claim 1, wherein the pitch safety system comprises a mechanical locking device which is adapted to be inserted in connection with the blade, thereby mechanically locking the blade in a predetermined position.

10. The hydraulic pitch system according to claim 1, wherein a wind turbine controller is connected to the pitch system, the wind turbine controller being adapted to assist in the control of the pitch system.

11. A wind turbine system according to claim 1, wherein the pitch safety system comprises a control unit, the control unit being adapted for controlling that the hydraulic pitch system, and thereby the wind turbine, is in its service mode.

12. A wind turbine comprising the hydraulic pitch system according to claim 1.

13. A hydraulic pitch system for pitching a blade of a wind turbine having a hub by means of a hydraulic fluid, comprising:
   at least one hydraulic cylinder for adjusting a pitch angle of the blade, the hydraulic cylinder comprising a pitch piston movable in the hydraulic cylinder, and a first port and a second port arranged on respective sides of the pitch piston, and
   an accumulator located within the hub and hydraulically connected to the cylinder, further comprising a pitch safety system adapted to maintain the blade in a predetermined pitch angle when a person is entering the hub of the wind turbine for service and/or maintenance, the pitch safety system comprising a first valve which by activation releases a pressure in the hydraulic pitch system by draining off the accumulator for the hydraulic fluid until the pressure has reached a predetermined pressure level, wherein the first valve is arranged for draining off the accumulator for hydraulic fluid, and closing off the inlet to the accumulator.

14. The hydraulic pitch system according to claim 13, wherein the draining of the accumulator is performed by an operator present in the hub manually activating the first valve.

15. A hydraulic pitch system for pitching a blade of a wind turbine having a hub by means of a hydraulic fluid, comprising:
  at least one hydraulic cylinder for adjusting a pitch angle of the blade, the hydraulic cylinder comprising a pitch piston movable in the hydraulic cylinder, and a first port and a second port arranged on respective sides of the pitch piston, and
  an accumulator hydraulically connected to the cylinder, further comprising a pitch safety system adapted to maintain the blade in a predetermined pitch angle when a person is entering the hub of the wind turbine for service and/or maintenance, the pitch safety system comprising a first valve which by activation releases a pressure in the hydraulic pitch system by draining off the accumulator for the hydraulic fluid until the pressure has reached a predetermined pressure level, wherein the first and second ports of the pitch cylinder are blocked by activation of the pitch safety system.

16. A method for activating a pitch safety system in a hydraulic pitch system for pitching blades of a wind turbine having a hub, the method comprising:
  activating the pitch safety system using a service panel arranged at an entrance to the hub before entering the hub so that the blades are positioned in their feathering positions,
  draining off hydraulic fluid from an accumulator located within the hub until a hydraulic pressure reaches a predetermined level, and
  entering the hub of the wind turbine.

17. The method according to claim 16, wherein the draining off of hydraulic fluid is performed automatically by activation of the pitch safety system.

18. The method according to claim 16, wherein a second valve is closed off either automatically or manually.

19. The method according to claim 16, wherein the wind turbine is stopped and a rotor lock is applied before the pitch safety system is activated.

20. A method for locking a blade of a wind turbine in a predetermined pitch angle, the method comprising the steps of:
  applying a pitch safety system of a hydraulic pitch system for positioning the blade in the predetermined pitch angle by activating a first valve located at a service panel arranged at an entrance to the hub before entering into the hub to release a pressure in the hydraulic pitch system by draining off hydraulic fluid from an accumulator until the pressure has reached a predetermined pressure level,
  inserting a mechanical locking device in connection with the blade for mechanically locking and securing the blade in the predetermined pitch angle.

* * * * *